Patented Nov. 8, 1927.

1,648,487

UNITED STATES PATENT OFFICE.

ARTHUR LIEBRECHT, OF FRANKFORT-ON-THE-MAIN, GERMANY, ASSIGNOR TO CHEM-ISCH-PHARMAZEUTISCHE CORPORATION, OF BAD HOMBURG, A CORPORATION OF GERMANY.

PROCESS FOR THE MANUFACTURE OF QUININE SOLUTIONS SUITABLE FOR SUBCUTANEOUS INJECTIONS.

No Drawing. Application filed July 13, 1925, Serial No. 43,406, and in Germany July 14, 1924.

The therapeutical use of quinine has been extended recently in many directions. Thus, for example, its peculiar specific effect in cases of pneumonia caused by pneumococci has been established. The quinine has also proved to be of the greatest importance in certain forms of bronchial inflammations, especially when applied subcutaneously. The aqueous solutions of the salts of quinine, however, which have hitherto been employed have caused in many cases symptoms of great irritation, which might have been avoided by the use of the base. Moreover, the use of the base in place of the salt would have been all the more desirable on account of its greater efficiency. (See, for example, Michaelis Zeitschrift für Immunitätsforschung und Experiments. Therapie I 34 page 104.)

The application by means of subcutaneous injection of the quinine base failed, however, by reason of the quinine base being too little soluble in such liquids as are capable of being employed for subcutaneous injections. Attempts were made to prepare solutions of quinine in oils suitable for these injections, but they succeeded only in so far as it was possible to dissolve up to one percent, if they succeeded at all. These very weak solutions, furthermore were found to be unstable and therefore could not be kept for any length of time.

The present invention relates to the preparation of solutions of quinine in olive oil and other kinds of oil. Such concentrations are thereby obtained as are required for the application in practical use. The method by which this aim is attained consists in dissolving the quinine base in the presence of terpenes such as terpineol, menthol, linalool and similar compounds in the oils concerned.

For example 1.0 gram of quinine is dissolved in 3 cc. of terpineol at an elevated temperature and the mixture is then added to 8 cc. of olive oil. A clear solution is produced which may be kept for a long time without decomposition or separation. The solution contains about 10 percent of quinine and is particularly well suited for subcutaneous injections.

Instead of one terpene, a mixture of two or more may be taken in order to increase the solubility of the quinine in the oil. In addition to substances which facilitate the solution in oil in accordance with my invention other substances may also be present which are capable of exerting a beneficial influence upon the affected organs.

Terpenes which combine both the capacity of having a beneficial effect by themselves and the capability of increasing the solubility of the quinine base in oil are of special advantage. Thus, for instance, eucalyptol has a strongly stimulating effect upon the mucous membranes of the bronchi. As it is eliminated by the lungs, whereas the quinine is stored therein, the combination of the eucalyptol with quinine in sufficiently great quantities is particularly valuable as a remedy. A combination of this kind is, for example, produced by dissolving 2 grm. of quinine in a mixture of 10 grams of menthol and 10 cc. of eucalyptol by warming and the mixture is then added to 50 cc. of olive oil. Additional terpenes or material containing terpenes, for example, two grams camphor may be advantageously added to the preparation. The solution forms a faintly coloured liquid which was proved to be without any irritating effect on being injected subcutaneously.

Now having particularly described and ascertained the nature of my said invention and in what manner the same is to be performed, I declare that what I claim is:

1. Process for making quinine solutions, consisting in that the quinine base is dissolved in suitable oils in presence of terpenes.

2. Process for making quinine solutions, consisting in that the quinine base is dissolved in olive oil in presence of at least one terpene.

3. Process for making quinine solutions, characterized in that the quinine base is dissolved in terpenes, and the so obtained solution is mixed with a suitable oil.

4. A composition of matter for therapeutic purposes, consisting in a solution which contains quinine, at least one terpene and a suitable oil.

5. A composition of matter, consisting of a solution which contains quinine, menthol and one oil.

6. A composition of matter which contains quinine, menthol, eucalyptol and olive oil.

7. A composition of matter which comprises 2 parts quinine, 10 parts menthol, 10 parts eucalyptol and a suitable quantity of olive oil.

8. A composition of matter for therapeutical use, consisting in a mixture of approximately 2 grms. of quinine with approximately 10 grms. of menthol and 10 cc. of eucalyptol and 50 cc. of olive oil.

In testimony whereof I affix my signature.

Dr. ARTHUR LIEBRECHT.